3,058,930
ADHESIVE COMPRISING ELASTOMER AND COPOLYMER OF ENDO-DIENE BICYCLOHEPTADIENE AND A TERPENE

Carlos M. Samour, Wellesley Hills, Mass., assignor to The Kendall Company, Boston, Mass., a corporation of Massachusetts
No Drawing. Filed Sept. 8, 1959, Ser. No. 838,426
22 Claims. (Cl. 260—4)

This invention relates to pressure-sensitive adhesives employing novel tackifier resins formed by copolymerizing a terpene, or a mixture of terpenes, and an endo-diene-bicyclo hydrobarbon. More particularly, this invention relates to pressure-sensitive adhesives wherein the tackifier resin is a copolymer of one or more terpenes with a bicycloheptadiene.

Pressure-sensitive adhesives are well known in industry, normally as adhesive coatings on various backings in the form of pressure-sensitive adhesive tapes. Pressure-sensitive adhesives contain, basically, a combination of a polymeric cohesive agent and a compatible, thermoplastic tackifier material which is an adhesion- and tack-imparting component. Other components may be combined or processed with the cohesive agent and the tackifier material for the purpose of supplementing the cohesion or adhesion of the adhesive, or for other purposes.

Pressure-sensitive adhesives are normally tacky to the touch, and adhere to a wide variety of surfaces upon the application of slight pressure. In their pressure-sensitive state, the adhesives are cleanly strippable from smooth surfaces without the adhesive splitting within itself to leave a deposit thereof upon the surface to which it has been adhered. Adhesion is a term which describes the characteristic of the adhesive to attach itself to other surfaces. Cohesion, or cohesive strength, are terms which describe the coherence or internal strength of the adhesive. A proper balance between adhesion and cohesion is essential to satisfactory performance of pressure-sensitive adhesive. In many cases, materials which alone appear suitable as tackifier materials are unsatisfactory because of their adverse influence upon cohesion of the adhesive. Also, the influence of an otherwise apparently satisfactory tackifier material upon tack and adhesion, when compounded with the polymeric cohesive agent, is somewhat unpredictable. The adhesion, cohesion, and the balance between the properties, in addition to surface tackiness, are interdependent upon each other and are influenced by chemical and physical properties of the materials in a manner altogether not fully understood. Furthermore, the balance between cohesion and adhesion is sensitive to elevated temperatures.

It is an object of this invention to provide pressure-sensitive adhesives containing, in combination with a polymeric cohesive agent, a new and novel compatible adhesion- and tack-imparting material. Further, is is an object of this invention to provide pressure-sensitive adhesive containing a tackifier resin derived, at least in part, from a material which by itself in resinous form is unsatisfactory as a tackifier material. Among these and other objects of this invention are included pressure-sensitive adhesives wherein the pressure-sensitive properties thereof are related to the composition of the tackifier resin and pressure-sensitive adhesives which exhibit a highly satisfactory balance of cohesion and adhesion.

In accordance with this invention, new and special resins are employed as the tackifier in combination with polymeric cohesive agents of pressure-sensitive adhesives. As in known pressure-sensitive adhesives, the cohesive agent may be any one or a blend of rubbery elastomers. The rubbery elastomers may be either a natural or synthetic material and include natural rubber; polymerized isomonoolefins, such as polyisobutylene rubber; polymerized dienes and substituted dienes, such as polybutadiene rubber, polyisoprene rubber, polymethylisoprene rubber, polymethylpentadiene rubber, including rubbery polymers of haloprenes such as polychloroprene (neoprene); rubbery polymers of vinyl substituted compounds, such as polyvinylethers and polyacrylates; and copolymers of compounds selected from these classes of compounds, such as butadiene-styrene rubber (GR-S), butadiene-acrylonitrile rubber, and butyl rubber which is a copolymer of isobutylene with a diene such as isoprene or butadiene. In general, synthetic, high-molecular weight polymers equivalent, or substantially so, to natural rubber in properties to provide a cohesive, flexible, elastic base for the adhesive are suitable for use in pressure-sensitive adhesive formulations.

The special tackifier resins referred to above are thermoplastic copolymers of a terpene and an endo-diene bicyclo hydrocarbon, specifically a bicycloheptadiene. The terpene-bicycloheptadiene resins employed in accordance with this invention are thermoplastic, are substantially soluble in aliphatic, aromatic and chlorinated hydrocarbon solvents, and can be prepared in a variety of softening points and molecular weights. Representative solvents in which these resins are soluble are petroleum ether, gasoline, cyclohexane, heptane, benzene, toluene, methylene chloride, chloroform and tetrachloroethane. A variety of resins having a wide range of softening points, from about room temperature, or slightly above, to as high as about 180°–190° C., have been prepared in a variety of molecular weights, depending upon the type of terpene, the ratio of terpene or mixture of terpenes to bicycloheptadiene, the type of catalyst, and the reaction conditions. Preferably, the terpene or mixture of terpenes are bicyclic terpenes, such as alpha-pinene or beta-pinene, or monocyclic terpenes, such as dipentene and the like. These resins are compatible with the rubbery elastomers referred to above which may be employed as the cohesive base of pressure sensitive adhesives.

Homopolymeric bicycloheptadiene resin is not useful as a tackifier resin in combination with rubbery, elastomers for making pressure-sensitive adhesives. In general, homopolymeric bicycloheptadiene has been found to destroy tack and adhesion which the rubbery elastomer itself may have, making the combination of polybicycloheptadiene and rubbery elastomer useless as a pressure-sensitive adhesive.

Of the terpene homopolymers, polymerized substantially pure beta-pinene has been commercially used in combination with rubbery, cohesive elastomers. Other terpenes, such as the bicyclic alpha-pinene and the monocyclic dipentene are more difficulty polymerizable than pure beta-pinene, and form resins which are not as satisfactory as polymerized substantially pure beta-pinene for use as tackifier resins. This is unfortunate because of the diminishing sources of terpenes containing a high content of beta-pinene. On the other hand, alpha-pinene is available in greater quantities than beta-pinene.

Surprisingly, in view of the non-tackifier properties of homopolymeric bicycloheptadiene, copolymeric terpene-bicycloheptadiene resins containing even a predominantly major proportion of bicycloheptadiene, are suitable as tackifier resins. The exact maximum amount of bicycloheptadiene which may be copolymerized with a terpene or mixture thereof to obtain resins having effective adhesion- and tack-imparting properties when in combination with thermoplastic, rubbery, elastomeric cohesive agents will depend primarily upon the type of terpene, or mixture thereof, for any given set of polymerizing conditions. Based upon the studies of the tackifier properties of these copolymer resins, it may be stated in some generality that the ratio, on a molar basis, of terpene to bicycloheptadiene should not be less than 1:9, at least in the case of bicyclic terpenes, such as alpha- and beta-pinenes; preferably, the terpene:bicycloheptadiene molar ratio should be within the range of about 9:1 to 1:4. At one extreme, only very minor amounts of bicycloheptadiene copolymerized with a terpene produces a copolymer resin of significant tackifier properties. At the other extreme, the variety of polymerizable terpenes which may be copolymerized with bicycloheptadiene, the complexity of polymer resin chemistry, and the complexity of the chemistry of pressure-sensitive adhesives, permits only a qualified generalization that the minimum amount of terpene must be an amount effective to produce a tackifier resin when copolymerized with bicycloheptadiene.

A particularly surprising phenomenon of this invention is that a 1:1 terpene:bicycloheptadiene resin is a better tackifier resin in conventional pressure-sensitive adhesive formulations than terpene-bicycloheptadiene resins having a higher terpene ratio, for a given terpene or mixture of terpenes. Thus, a 1:1 terpene-bicycloheptadiene resin imparts a greater degree of adhesion to a natural rubber based pressure-sensitive adhesive than a 4:1 terpene:bicycloheptadiene resin. Beyond or about terpene:bicycloheptadiene ratios of about 1:2 and 1:4 the effectiveness of the resins as tackifiers decreases, until the amount of bicycloheptadiene is so large that the resins are substantially ineffective tackifiers.

Another advantage of this invention is that the terpene of the terpene-bicycloheptadiene tackifier resins may consist of terpenes heretofore not extensively used, if at all, as tackifier resins in pressure-sensitive adhesives. Thus, the terpene may be alpha-pinene, pure or in mixtures with other terpenes, and even monocyclic terpenes such as dipentene. Heretofore, polymerized pure, or substantially pure, beta-pinene has been the principal terpene polymer employed as tackifier resins. Accordingly, this invention affords a new use for these other polymerizable terpenes.

According to this invention, the terpene-bicycloheptadiene tackifier resins may be employed in combination with the rubbery elastomers in pressure-sensitive adhesive formulations in the same proportions as present conventional tackifier resins. Per 100 parts by weight of rubbery elastomer, from about 25 to 150 parts by weight of the terpene-bicycloheptadiene tackifier resins may be combined with the rubbery elastomer; additionally, minor to substantial amounts of plasticizers (between about 10 to 150 parts by weight) and up to about 300 parts by weight of fillers may be compounded with the rubbery elastomer and terpene-bicycloheptadiene resin. Stabilizers, usually on the order of only one or two parts per 100 parts of the rubbery elastomer, on a weight basis, are advantageously employed to improve the age and/or oxidation resistance of the adhesive. Plasticizers conventionally used include white mineral oil, light petroleum oils and many other stable, compatible oils. Fillers may be silica, titanium dioxide, clay, or zinc oxide, to name a few. Suitable stabilizers include such antioxidants as condensation products of aniline and acetone, polymerized trimethyldihydroquinoline, di-o-tolyl ethylene diamine, mixtures of hydrocarbon substituted diaryl amines and petroleum wax, styrenated phenolic resins, hydroquinone monobenzyl ether, and alkylated polyhydroxy phenols. The rubbery elastomer may also be compounded with curing or crosslinking agents for the purpose of improving the cohesive strength of the adhesive in the manner well known in the art.

The pressure-sensitive adhesives of this invention may contain the terpene-bicycloheptadiene tackifier resins as the sole tackifier agent, or may contain other tackifier resins in combination therewith. Examples of other tackifier resins are rosin, hydrogenated rosin, disproportionated rosin, glyceride esters of rosin and hydrogenated rosin, pentaerythritol esters of hydrogenated rosin, polymerized substantially pure beta pinene resin, hydrogenated indenecoumarone type resins, and petroleum hydrocarbon resins.

EXAMPLES 1–55

Specific examples illustrating the pressure-sensitive adhesives of this invention are tabulated in Tables A and B. Examples of pressure-sensitive adhesives containing representative conventional tackifier resins are also included in Tables A and B for purposes of comparison and illustration of the compatibility of the terpene-bicycloheptadiene tackifier resins with other tackifier resins.

For the sake of convenience, a code consisting of a group of letters followed by two digits has been adopted in the tables to identify the composition of the terpene-bicycloheptadiene tackifiers. The last letter in each group of letters preceding the digits is a B, signifying bicycloheptadiene. The preceding letter or letters designate the terpene copolymerized with bicycloheptadiene. Thus, P signifies alpha-pinene; T signifies spirits of a pure gum turpentine; WT is a shorthand designation of a steam distilled wood turpentine; beta-P is beta pinene; and D is dipentene. The specific composition of these terpenes will be more specifically identified later.

The two digits following the letters in the code designate the ratios of the terpene to the bicycloheptadiene, on a molar basis. Thus, PB–41 is a tackifier resin produced by copolymerizing 4 mols of alpha-pinene and 1 mol of bicycloheptadiene. In some instances, the letter "A" immediately follows the two digits; this distinguishes the particular resin from other resins having the same composition, but differing therefrom in softening point and/or molecular weight. For example, PB–11 and PB–11A are both prepared from equimolar amounts of alpha-pinene and bicycloheptadiene, but have different softening points and molecular weights due to different methods of preparation.

The same method of preparation was used for all of the adhesives, except for the adhesives of Examples 39–45. Except in Examples 39–45, the pale crepe rubber was first milled for about 20 minutes. The GR–S rubbers (butadienestyrene rubbers) were milled for 10 minutes. The Vistanex L–100 (polyisobutylene rubber) and Hycar–1042 (butadiene acrylonitrile rubber) were not milled prior to compounding with the other ingredients. The elastomer, tackifier, fillers, if any, and stabilizers, if any, were added to a suitable container in the proportions set forth in Tables A and B. The proportions of the ingredients are expressed in terms of parts by weight. A solvent, such as cyclohexane, was then added in an amount to produce a 9% solution, based on the weight of the rubbery elastomer. The container was sealed and tumbled or stirred until a homogeneous mixture was obtained.

The adhesives of Examples 39–41 were prepared by first mixing the elastomer, fillers and a mixture of stabilizers in a Banbury Mixer for two minutes at a fast speed. This Banbury mixture was then combined with the tackifier and a solvent solution thereof prepared in the same manner as in the other examples.

In Examples 42 and 43 the zinc oxide filler was added to the rubbery elastomer while masticating the elastomer on a two roll mill for about 10 minutes at about 88° C. In Examples 44 and 45 the silica filler was added to the rubbery elastomer while masticating the elastomer on the mill for about 5 minutes at about 92° C. The tackifier resins were then combined with these mixtures of masticated elastomer and fillers and solvent solutions thereof were prepared in the same manner as in the other examples.

Tapes were then prepared by spreading the adhesive solutions upon suitable backings using a hand caster set at about 15 mils. The spread films were allowed to dry for approximately 2½ hours at normal room temperature and then were covered with a release paper facing material during storage prior to testing. In Examples 1–30, the backing was cellophane and in Examples 31–55 the backing was a commercial paper stock for paper adhesive tapes.

Table A

| Examples | Elastomer | | | Tackifier | | | | | | | Adhesion, lbs. at 70° F. | Failure temp., °F. |
|---|---|---|---|---|---|---|---|---|---|---|---|---|
| | Pale crepe | GR-S-1022 | Vistanex L-100 | Piccolyte S-125 | Piccopale 70 | Stay-belite | PB-41 | PB-11 | PB-12 | TB-11 | | |
| 1 | 100 | | | 67 | | | | | | | 1.89 | --- |
| 2 | 50 | 50 | | 67 | | | | | | | 3.38 | 130 |
| 3 | 70 | | 30 | 67 | | | | | | | 2.99 | 160 |
| 4 | | 100 | | 67 | | | | | | | 2.11 | 100 |
| 5 | 50 | 50 | | 47 | 20 | | | | | | 3.19 | 135 |
| 6 | 70 | | 30 | 47 | 20 | | | | | | 3.00 | 165 |
| 7 | 100 | | | 33 | | 33 | | | | | 1.64 | 105 |
| 8 | 50 | 50 | | 33 | | 33 | | | | | 2.51 | 125 |
| 9 | 70 | | 30 | 33 | 33 | | | | | | 2.10 | 120 |
| 10 | 100 | | | | | | | | 67 | | 1.51 | 150 |
| 11 | 100 | | | | | | | | 67 | | 2.38 | --- |
| 12 | 50 | 50 | | | | | | | | 67 | 3.56 | 135 |
| 13 | 100 | | | | | | | | | 67 | 2.60 | 160 |
| 14 | 50 | 50 | | | | | | | | 67 | 3.88 | 150 |
| 15 | 70 | | 30 | | | | | | | 67 | 3.92 | 155 |
| 16 | | 100 | | | | | 27 | 40 | | | 3.43 | 105 |
| 17 | 50 | 50 | | | | | 27 | 40 | | | 2.78 | 130 |
| 18 | 70 | | 30 | | | | 27 | 40 | | | 2.90 | 155 |
| 19 | | | 100 | | | | 67 | | | | 4.56 | 135 |
| 20 | 100 | | | | | | | 47 | | | 0.67 | --- |
| 21 | 50 | 50 | | | 20 | | | 47 | | | 2.81 | 120 |
| 22 | 70 | | 30 | | 20 | | | | | 33 | 3.14 | 140 |
| 23 | 50 | 50 | | | | 33 | | | | 33 | 2.50 | 135 |
| 24 | 70 | | 30 | | | 33 | | | | 33 | 2.61 | 130 |
| 25 | 100 | | | | | 33 | | | | 47 | 1.81 | 110 |
| 26 | 100 | | | | 20 | | | | | 33 | 2.34 | 160 |
| 27 | 100 | | | | 33 | | | 33 | | 33 | 1.51 | 170 |
| 28 | 100 | | | | | | | 33 | | | 1.94 | 140 |
| 29 | 100 | | | | 20 | | | 47 | | 33 | 1.75 | 175 |
| 30 | 100 | | | | 33 | | | | | | 1.64 | 140 |

Table B

| Examples | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
|---|---|---|---|---|---|---|---|---|---|---|---|---|---|---|---|---|---|---|---|---|---|---|---|---|---|
| Elastomer: | | | | | | | | | | | | | | | | | | | | | | | | | |
| Pale crepe | 100 | 100 | 100 | 100 | 100 | 100 | 100 | 100 | 100 | 100 | 100 | 100 | 100 | 100 | 100 | 100 | 100 | 100 | 100 | 70 | 70 | 70 | 50 | 50 | 50 |
| GR-S-1011 | | | | | | | | | | | | | | | | | | | | 30 | 30 | 30 | 50 | 50 | 50 |
| Hycar-1042 | | | | | | | | | | | | | | | | | | | | | | | | | |
| Tackifier: | | | | | | | | | | | | | | | | | | | | | | | | | |
| Piccolyte S-125 | 67 | 67 | | | | | | | 67 | | | 67 | | 67 | | | | | | | | | 67 | | 67 |
| Piccolyte S-125 | | | 67 | | 67 | | | | | 67 | | | | | | | | | | 67 | | | | | |
| TB-11 | | | | 67 | | 67 | | | | | 67 | | 67 | | 67 | | | | | | 67 | | | | |
| PB-11A | | | | | | | 67 | | | | | | | | | | | | | | | | | | |
| TB-11A | | | | | | | | 67 | | | | | | | | | | | | | | | | | |
| TB-21 | | | | | | | | | | | | | | | | | 67 | | | | | | | | |
| WTB-21 | | | | | | | | | | | | | | | | 67 | | | | | | | 67 | | |
| DB-21 | | | | | | | | | | | | | | | | | | | 67 | | | | | | |
| PB-41A | | | | | | | | | | | | | | | | | | 67 | | | | | | | |
| Beta-PB-11 | | | | | | | | | | | | | | | | | | | | | | | | 33 | |
| TB-91 | | | | | | | | | | | | | | | | | | | | | | | | 33 | |
| PB-19 | | | | | | | | | | | | | | | | | | | | | | | | | |
| Fillers: | | | | | | | | | | | | | | | | | | | | | | | | | |
| ZnO | | | | | | | | | | 19 | 19 | 19 | 67 | 67 | | | | | | | | | | | |
| TiO₂ | | | | | | | | | | 19 | 19 | 19 | | | | | | | | | | | | | |
| SiO₂ | | | | | | | | | | | | | | | | 24 | 24 | | | | | | | | 1 |
| Stabilizers | | 1 | 1 | | 1 | 1 | 1 | 2 | 2 | 2 | 1 | 1 | 1 | 1 | 1 | 1 | 1 | 1 | 1 | 1 | 1 | 1 | 1 | 1 | 1 |
| Adhesion, lbs. at 70° F | 3.05 | 3.51 | 3.69 | 3.30 | 3.38 | 3.96 | 3.55 | 2.97 | 4.78 | 4.95 | 5.30 | 3.82 | 4.45 | 3.44 | 3.50 | 3.47 | 1.83 | 2.50 | 2.62 | 3.58 | 5.08 | 4.47 | 3.98 | 1.50 | 4.10 |
| Failure temp., °F | | 165 | >180 | | >180 | 180 | 180 | 100 | 100 | 120 | 120 | 125 | 130 | 160 | 150 | 180 | 180 | 165 | 170 | 160 | 155 | 125 | 180 | 110 | |
| Creep, hrs. at 160° F | | 27.3 | 34.8 | | 31.4 | 26.9 | 16.1 | 0.71 | >8.84 | 3.49 | 0.82 | 0.52 | 2.36 | 3.65 | 11.15 | 17.2 | >100 | 8.67 | 27.3 | 12.6 | 10.6 | 6.25 | 6.5 | 5.9 | |

The adhesion and, for most examples, the temperature at which the adhesive fails cohesively during the adhesion test are reported in Tables A and B. The creep resistances as a test of the cohesion of the adhesives were measured for most of the paper-backed tapes and are reported in Table B. The adhesion is determined by a 180° peel test and is reported in terms of pounds of force at 70° F. necessary to remove the tape, while peeling the tape back at a 180° angle at a constant rate of speed, from the surface of a heated stainless steel panel. In this test a strip of the tape one inch wide and of suitable length is uniformly pressed with the adhesive side down on the stainless steel surface. One end of the tape is doubled back at a 180° angle and inserted in one of the clamps of an Instron Tensile Tester. An end of the stainless steel strip is inserted in the second clamp of the Tester so that when the lower clamp moves downward the adhesive tape is stripped back from the stainless steel surface at an angle of about 180°. The pounds of force required to remove the tape in this manner from the surface of the panel at the designated temperature is automatically recorded by the Tester.

The temperature at which the adhesive fails cohesively during a 180° peel test is reported in Tables A and B as the "failure temperature" in degrees Fahrenheit. As described above, the tape is applied to a stainless steel panel and peeled therefrom at a 180° angle by means of an Instron Tensile Tester. The failure temperature reported is the temperature of the panel at which the adhesive film of the tape splits within itself and offsets on the stainless steel surface. This test is valuable as a guide to judge the performance of pressure-sensitive adhesive tapes which may be removed from surfaces at elevated temperatures.

The creep resistance of the adhesive is an evaluation of the cohesive strength of the adhesive determined by suspending weights to a tape applied to a vertical surface, thereby applying a force to the adhesive tape in a direction in the plane of the tape tending to pull the tape from the surface in a shearing action. This is reported in Table B as "Creep," in terms of the length of time required for a sample of the tape to be pulled off of a two inch long, heated, stainless steel plate for all of the tapes of the examples in Table B except Examples 42–45. In Examples 42–45, the Creep time is the length of time it would take for the tapes to move one-half of an inch, based upon the increments of movement noted at regular time intervals. Specifically, this test is conducted by uniformly pressing a 1" x 6" sample of tape, adhesive side down, on a 1¾" x 2" stainless steel plate, both plate and tape aligned longitudinally, and with end portions of the tape extending over the ends of the plate. This is done approximately 24 hours prior to testing. At one end of the plate, the tape is then cut to coincide exactly with the edge of the plate. The plate is then attached to the vertical surface of a heated bar (about 160°±5° F.) so that the said cut edge of the tape is at the top of the plate. The plates and tapes are permitted to come to thermal equilibrium and a 1000 gram weight is then attached to the bottom, free end of the tape and the time noted. At regular intervals the distance from the top edge of the plate to the top edge of the tape is measured to the ½₂ of an inch.

The pressure-sensitive adhesives of the invention exhibited various degrees of tack level, depending upon the type of terpene and the ratio of terpene to bicycloheptadiene in the copolymer resins, and also the manner in which the resins were prepared. Tack was determined by both the "thumb appeal" test and the rolling ball test.

Referring to Tables A and B, Piccolyte S-125 and S-135 are polymerized substantially pure beta-pinene resins and Piccopale-70 is a polymerized petroleum bottoms resins, both sold by Pennsylvania Industrial Chemical Corporation. Staybelite is a hydrogenated wood rosin sold by Hercules Powder Company. These are representative of resins employed in commercial pressure-sensitive adhesives as tackifier resins.

The terpene-bicycloheptadiene tackifier resins may be prepared by the catalytic copolymerization of bicycloheptadiene with a terpene, particularly terpenes which by themselves form homopolymers. Effective catalysts may be chosen from Lewis acid catalysts, particularly Friedel-Crafts catalysts which are halides of polyvalent metals such as $AlCl_3$, $TiCl_3$ and $BF_3$. The reaction may be conducted in either the absence or presence of solvents and preferably under an inert atmosphere. The preparation of the terpene-bicycloheptadiene tackifier resins used herein to illustrate this invention is described below; for a more detailed explanation of resins of this type and the manner in which they may be prepared consult copending application Serial No. 833,055, filed August 11, 1959.

EXAMPLES I–XIII

The resins of Table C are identified by the aforedescribed code and correspond to the resins employed in the adhesives of the examples in Tables A and B. The reaction conditions and the softening points and molecular weights, where determined, are recorded in Table C.

In each of Examples I, II and IV–XIII the particular terpene or mixture of terpenes and bicycloheptadiene were dissolved in the stated solvent in a suitable reaction vessel in the molar proportions specified; the catalyst was added in small amounts over a period of time and the reactions conducted in a dry atmosphere. In Example III the catalyst was added to a solvent-free mixture of the terpene and bicycloheptadiene. The reaction was exothermic and the reaction mixture solidified on standing. The solidified mass was dissolved in dry benzene with the evolution of heat. An additional amount of catalyst was then added. Further addition of catalyst did not cause heat evolution. This mixture was then heated at about 55° C. for 20 minutes and then cooled. In all instances the dry atmosphere was nitrogen. The temperature, where necessary, was controlled by a heat abstracting means. In some instances, usually after all signs of a reaction had ceased, the reactants were heated. The time of the reaction, where noted, was measured from the time of the first addition of the catalyst to about the time the resulting reaction mixture was treated for the separation of the resins therefrom.

Preparatory to separation of the resin reaction products the reaction mixtures were cooled to room temperature or below. In Examples I–VI, VIII and X–XII the reaction mixtures were decomposed with either a dilute aqueous solution of hydrochloric acid or a dilute aqueous solution of sodium hydroxide. In a majority of cases the mixture was then washed with additional solvent before separation of the solvent layer therefrom. The separated solvent layer was then dried and the resin recovered therefrom by removal of the solvent by vacuum distillation. The reaction mixtures of Examples VII and XIII were decomposed by additions of isopropanol and water; the reaction mixture of Example IX was decomposed by the additions of isopropanol, butanol and water. The benzene layer was then separated. The resin was precipitated from the separated benzene layer of Example VII by additions of ethanol and methanol, and from the separated benzene layer of Examples IX and XIII by the addition of methanol. The precipitated resins were separated therefrom by filtration and washed with methanol. The resins of all of the examples were heated to dryness under vacuum and elevated temperatures.

Referring to Table C, the alpha-pinene is a commercial material comprising 85% alpha-pinene, 12% camphene and 3% of a mixture of dipentene and other monocyclic terpenes. The spirits of pure gum turpentine is a commercial grade thereof composed principally of a mixture of alpha- and beta-pinenes in about a 70:30 ratio. The steam-distilled wood turpentine consists approximately of 85% alpha-pinene, 5% of a mixture of bicyclic terpenes, including camphene, and 15% of monocyclic terpenes in admixture with a minor amount of p-menthane and p-cymene. Beta-pinene is a sulphate beta-pinene composed predominantly of beta-pinene and relatively minor amounts of other turpenoid materials. Dipentene is a commercial grade of dipentene composed of 15% dipentene, 18% of other terpenes, 17% of p-cymene and 14% of p-menthane. The bicycloheptadiene is bicyclo-(2.2.1)-2,5-heptadiene.

*Table C*

| Examples | Terpene/Bicycloheptadiene Resins | Solvent | Catalyst | Time of Reaction, Hrs. | Temp. of Reaction, °C. | Softening Point, °C. | Molecular Weight |
|---|---|---|---|---|---|---|---|
| I | PB-41 | Benzene | $AlCl_3$ | 3 | 9 −65 | 61 | 1,300 |
| II | PB-41A | Cyclohexane | $AlCl_3/TiCl_3$ | 5 | 20 −60 | 70 | |
| III | PB-11 | | $AlCl_3$ | | 20 −55 | 170 | 2,560 |
| IV | PB-11A | Benzene | $AlCl_3$ | 6 | 6 −65 | 163 | 2,000 |
| V | PB-12 | do | $AlCl_3$ | 2⅔ | 3 −65 | 182 | 1,680 |
| VI | PB-19 | do | $AlCl_3$ | 3 | 5.5−60 | | 1,530 |
| VII | TB-21 | do | $AlCl_3$ | 6 | 8.5−44 | 143 | 2,100 |
| VIII | TB-11 | do | $AlCl_3$ | 3½ | 5 −50 | 146 | 2,900 |
| IX | TB-11A | do | $AlCl_3$ | 6 | 8 −40 | 179 | 3,100 |
| X | TB-91 | Toluene | $AlCl_3/TiCl_3$ | 3 | 28 −58 | 43 | 940 |
| XI | WTB-21 | $CHCl_3$ | $AlCl_3$ | 4 | 5 −60 | 103 | 1,710 |
| XII | Beta-PB-11 | Benzene | $AlCl_3$ | 4 | 5.5−50 | 158 | 2,200 |
| XIII | DB-21 | do | $AlCl_3$ | 4¾ | 4 −50 | 130 | 850 |

The softening points of the resins of Table C were determined using a Dennis melting point apparatus (Model MP. 11), the temperature being measured by the use of a pyrometer. The samples of the resins were finely powdered and sprinkled across the bar of the apparatus in a narrow train within the softening region of the bar. The softening point of the resin is a temperature at which the sample began to soften and adhere to the bar. The molecular weights of the resins are cryoscopic molecular weights using bromo-form or benzene as the solvent. The softening points of the Piccolytes S–125 and S–135 determined according to the method described herein are 116° C. and 120° C., respectively; the cryoscopic molecular weights of these Piccolyte resins are 1540 and 1950, respectively.

Since various embodiments may be made of this invention and many changes can be made based on the foregoing description, it is to be understood that the description is to be interpreted as illustrative and the claims to include such embodiments and changes.

What is claimed is:

1. A pressure-sensitive adhesive comprising a mixture of a rubbery elastomer and a tackifier resin, the tackifier resin comprising a copolymer of at least one unsaturated $C_{10}$ terpene and an endo-diene bicyclo hydrocarbon.

2. A pressure-sensitive adhesive comprising a mixture of a rubbery elastromer and a tackifier, the resin tackifier resin comprising a copolymer of at least one unsaturated $C_{10}$ terpene and an endo-diene bicycloheptadiene.

3. A pressure-sensitive adhesive comprising a mixture of a rubbery elastomer and a tackifier resin, the tackifier resin comprising a copolymer of at least one $C_{10}H_{16}$ terpene and bicyclo-(2.2.1)-2,5-heptadiene, said copolymer containing at least an amount of terpene effective to impart tackifier properties to said copolymer when in combination with the rubbery elastomer.

4. A pressure-sensitive adhesive comprising a mixture of a rubbery elastomer and a tackifier resin, the tackifier resin comprising a $C_{10}H_{16}$ terpene:bicyclo-(2.2.1)-2,5-heptadiene copolymer having a terpene content such that the terpene:bicycloheptadiene molar ratio is not less than about 1:9, but at least effective to impart tacktifier properties to said copolymer when in combination with the rubbery elastomer.

5. A pressure-sensitive adhesive comprising a mixture of a rubbery elastomer and a tackifier resin, the tackifier resin comprising a $C_{10}H_{16}$ terpene:bicyclo-(2.2.1)-2,5-heptadiene copolymer having a terpene:bicycloheptadiene molar ratio not less than about 1:4.

6. The adhesive of claim 4 wherein the terpene is at least one bicyclic $C_{10}H_{16}$ terpene.

7. The adhesive of claim 4 wherein the terpene is at least one monocyclic $C_{10}H_{16}$ terpene.

8. The adhesive of claim 4 wherein the terpene is a turpentine.

9. The adhesive of claim 4 wherein the terpene is alpha-pinene.

10. The adhesive of claim 4 wherein the terpene is beta-pinene.

11. The adhesive of claim 4 wherein the terpene is dipentene.

12. The adhesive of claim 5 wherein the terpene is at least one bicyclic $C_{10}H_{16}$ terpene.

13. The adhesive of claim 5 wherein the terpene is at least one monocyclic $C_{10}H_{16}$ terpene.

14. The adhesive of claim 5 wherein the terpene is a turpentine.

15. The adhesive of claim 5 wherein the terpene is alpha-pinene.

16. The adhesive of claim 5 wherein the terpene is beta-pinene.

17. The adhesive of claim 4 wherein the rubbery elastomer consists essentially of a rubbery polymerized mono-olefin.

18. A pressure-sensitive adhesive comprising a mixture of a rubbery elastomer and a tackifier resin, the tackifier resin comprising a thermoplastic, tack-imparting copolymer of at least one $C_{10}H_{16}$ terpene and bicyclo-(2.2.1)-2,5-heptadiene, said rubbery elastomer consisting essentially of butadiene-styrene rubber.

19. A pressure-sensitive adhesive comprising a mixture of a rubbery elastomer and a tackifier resin, the tackifier resin comprising a thermoplastic, tack-imparting copolymer of at least one $C_{10}H_{16}$ terpene and bicyclo-(2.2.1)-2,5-heptadiene having a molar ratio of the terpene and the bicycloheptadiene within the range of about 9:1 to about 1:9.

20. A pressure-sensitive adhesive comprising a mixture of a rubbery elastomer and a tackifier resin, the tackifier resin comprising a thermoplastic, tack-imparting copolymer of at least one $C_{10}H_{16}$ terpene and bicyclo-(2.2.1)-2,5-heptadiene having a molar ratio of the terpene and the bicycloheptadiene within the range of about 9:1 to about 1:4.

21. A pressure-sensitive adhesive comprising a mixture of a rubbery elastomer and a tackifier resin, the tackifier resin comprising a copolymer of at least one $C_{10}H_{16}$ terpene and bicyclo-(2.2.1)-2,5-heptadiene, said copolymer containing at least an amount of terpene effective to impart tackifier properties to said copolymer when in combination with said rubbery elastomer, the rubbery elastomer being selected from the group consisting of natural rubber, butadiene-styrene rubber, butadiene-acrylonitrile rubber, butyl rubber, polyisobutylene rubber, and mixtures thereof.

22. A pressure-sensitive adhesive comprising a mixture of a rubbery elastomer and a tackifier resin, the tackifier resin comprising a $C_{10}H_{16}$ terpene:bicyclo-(2.2.1)-2,5-heptadiene copolymer having a terpene content such that the terpene:bicycloheptadiene molar ratio is not less than about 1:9, but at least effective to impart tackifier qualities to said copolymer when in combination with said rubbery elastomer, the rubbery elastomer rubber being selected from the group consisting of natural rubber, butadiene-styrene rubber, butadiene-acrylonitrile rubber, butyl rubber, polyisobutylene rubber, and mixtures thereof.

References Cited in the file of this patent

UNITED STATES PATENTS

| | | |
|---|---|---|
| 2,349,210 | Traylor | May 16, 1944 |
| 2,349,508 | Mack | May 23, 1944 |
| 2,648,614 | Martin et al. | Aug. 11, 1953 |
| 2,864,882 | Snell | Dec. 16, 1958 |
| 2,912,398 | Johnson et al. | Nov. 10, 1959 |
| 2,930,781 | Schmerling | Mar. 29, 1960 |

OTHER REFERENCES

Mollar: "Chem. of Organ. Com.," 2nd edition (1957), W. B. Saunders Co., Philadelphia, Pa. (page 850 pertinent).

UNITED STATES PATENT OFFICE
CERTIFICATE OF CORRECTION

Patent No. 3,058,930            October 16, 1962

Carlos M. Samour

It is hereby certified that error appears in the above numbered patent requiring correction and that the said Letters Patent should read as corrected below.

Column 1, line 13, for "hydrobarbon" read -- hydrocarbon --; line 54, for "is", first occurrence, read -- it --; line 56, for "adhesive" read -- adhesives --; column 2, line 50, for "difficulty" read -- difficultly --; column 3, line 18, for "terpene-bicycloheptadiene" read -- terpene:bicycloheptadiene --; colums 5 and 6, table B, "Example 50", strike out "67", first occurrence, reading downwardly; columns 7 and 8, table C, Example IX, under the heading "Temp. of Reaction, G." for "8-40" read -- -8-40 --.

Signed and sealed this 30th day of July 1963.

(SEAL)
Attest:

ERNEST W. SWIDER
Attesting Officer

DAVID L. LADD
Commissioner of Patents